United States Patent
Mohammed

(10) Patent No.: US 9,915,199 B2
(45) Date of Patent: Mar. 13, 2018

(54) BI-DIRECTIONAL COMPRESSION FAN ROTOR FOR A GAS TURBINE ENGINE

(71) Applicant: United Technologies Corporation, Hartford, CT (US)

(72) Inventor: Sohail Mohammed, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 347 days.

(21) Appl. No.: 13/646,783

(22) Filed: Oct. 8, 2012

(65) Prior Publication Data

US 2014/0096507 A1    Apr. 10, 2014

(51) Int. Cl.
| F02C 3/08 | (2006.01) |
| F02C 3/09 | (2006.01) |
| F04D 29/28 | (2006.01) |
| F04D 29/32 | (2006.01) |

(52) U.S. Cl.
CPC ............... *F02C 3/09* (2013.01); *F02C 3/08* (2013.01); *F04D 29/284* (2013.01); *F04D 29/324* (2013.01); *F05D 2220/326* (2013.01); *F05D 2220/36* (2013.01)

(58) Field of Classification Search
CPC .... F04D 29/284; F04D 29/324; F04D 29/329; F04D 13/12; F04D 17/12; F04D 19/007; F04D 19/02; F04D 25/163; F04D 15/166; F04D 29/2211; F01D 1/023; F01D 1/08; F01D 13/00; F01D 13/02; F01D 1/20; F01D 1/22; F02C 3/08

USPC .......................................... 416/90 R, 93 R
See application file for complete search history.

(56) References Cited

U.S. PATENT DOCUMENTS

| 4,651,521 A | 3/1987 | Ossi |
| 4,976,102 A * | 12/1990 | Taylor ..................... 60/226.1 |
| 6,339,927 B1 | 1/2002 | DiPietro, Jr. |
| H2032 H | 7/2002 | DiPietro, Jr. |
| 7,032,859 B2 | 4/2006 | Mohr |
| 7,055,306 B2 * | 6/2006 | Jones et al. ............... 60/226.1 |
| 7,487,630 B2 * | 2/2009 | Weiler ....................... 60/226.1 |
| 7,758,303 B1 * | 7/2010 | Wadia et al. ................ 415/77 |
| 7,845,902 B2 | 12/2010 | Merchant |
| 7,972,109 B2 | 7/2011 | Crall et al. |
| 8,192,141 B1 | 6/2012 | Dale |
| 8,225,593 B2 | 7/2012 | LeHong et al. |
| 2006/0236675 A1 | 10/2006 | Weiler |

(Continued)

OTHER PUBLICATIONS

International Search Report and Written Opinion for International Application No. PCT/US2013/063348 completed on Jan. 9, 2014.

*Primary Examiner* — Dwayne J White
*Assistant Examiner* — William Grigos
(74) *Attorney, Agent, or Firm* — Carlson, Gaskey & Olds, PC

(57) ABSTRACT

A fan rotor has a hub, and a plurality of axial flow fan blades extending radially outwardly of the hub. A radial compressor impeller is positioned radially inwardly of the fan blades. The radial compressor impeller has an upstream inlet which extends generally in an axial direction defined by an axis of rotation of the hub. The radial flow compressor impeller has an outlet that extends radially outwardly of the inlet, and into a supply passage for supplying air to a core engine. An engine is also disclosed.

8 Claims, 2 Drawing Sheets

(56) References Cited

U.S. PATENT DOCUMENTS

| | | |
|---|---|---|
| 2009/0148297 A1 | 6/2009 | Suciu et al. |
| 2011/0030336 A1 | 2/2011 | Kuehn et al. |
| 2012/0195753 A1* | 8/2012 | Davis et al. .................. 415/229 |
| 2013/0115067 A1* | 5/2013 | Bronfeld et al. ............. 415/185 |

* cited by examiner

BI-DIRECTIONAL COMPRESSION FAN ROTOR FOR A GAS TURBINE ENGINE

BACKGROUND OF THE INVENTION

This application relates to a gas turbine engine, wherein a fan rotor has separate fan blades for delivering bypass air, and impellers for delivering core air.

Gas turbine engines are known, and typically include a fan delivering air into a bypass duct and into a core engine, where it is delivered into a compressor. Air is compressed in the compressor and delivered downstream into a combustor. The air is mixed with fuel in the combustor and ignited. Products of this combustion pass downstream over turbine rotors driving them to rotate.

Typically, the turbine rotors drive both compressor rotors and a fan rotor. More recently a gear reduction has been provided between a fan drive turbine and a fan rotor. This has allowed the fan drive turbine and the fan rotor to rotate at different speeds. For various reasons, this has allowed an increase in the size of the fan blades. In addition, with this arrangement the fan rotor may rotate at slower speeds.

SUMMARY OF THE INVENTION

In a featured embodiment, a fan rotor has a hub. A plurality of axial flow fan blades extend radially outwardly of the hub. A radial compressor impeller is positioned radially inwardly of the fan blades, and within the hub. The radial compressor impeller has an upstream inlet that extends generally in an axial direction defined by an axis of rotation of the hub. The radial compressor impeller has an outlet that extends radially outwardly of the inlet, and into a supply passage for supplying air to a core engine.

In another embodiment according to the previous embodiment, the radial compressor impeller has a plurality of circumferentially spaced blades. Intermediate radial vanes provide structural support between the hub and a radially inner portion of the hub.

In another embodiment according to any of the previous embodiments, air delivered by the fan blades is driven into a bypass duct as propulsion air.

In another embodiment according to any of the previous embodiments, the fan rotor is driven to rotate through a gear reduction.

In another featured embodiment, a gas turbine engine has a fan, a compressor, a combustor, and a turbine. The turbine includes a fan drive turbine which drives the fan through a gear reduction. The fan includes a hub, and a plurality of axial flow fan blades extending radially outwardly of the hub, and a radial compressor impeller positioned radially inwardly of the fan blades, and within the hub. The radial compressor impeller has an upstream inlet that extends generally in an axial direction defined by an axis of rotation of the hub. The radial compressor impeller has an outlet that extends radially outwardly of the inlet, and into a supply passage communicating to the compressor.

In another embodiment according to any of the previous embodiments, the radial compressor impeller has a plurality of circumferentially spaced blades. Intermediate radial vanes provide structural support between the hub and a radially inner portion of the rotor. In another embodiment according to any of the previous embodiments, In another embodiment according to any of the previous embodiments, air delivered by the fan blades is driven into a bypass duct as propulsion air.

In another embodiment according to any of the previous embodiments, the fan is driven to rotate by the fan drive turbine through a gear reduction.

These and other features may be best understood from the following drawings and specification.

DETAILED DESCRIPTION

Figure 1:
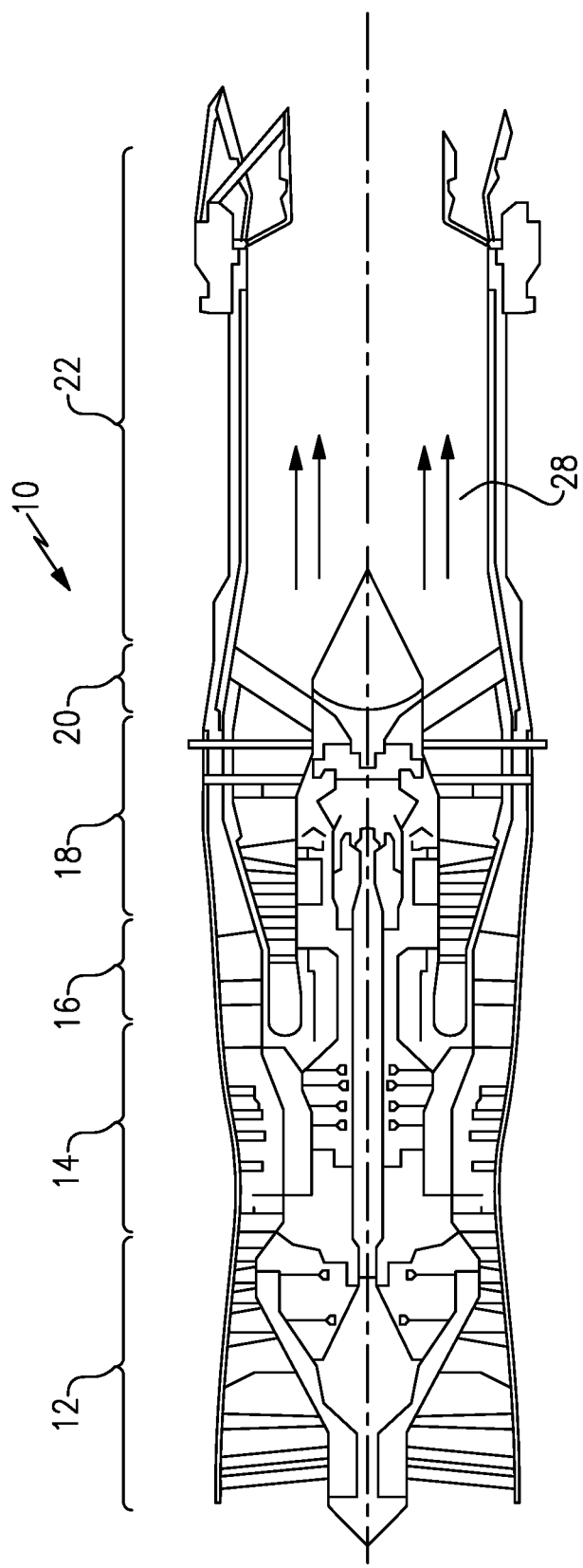
FIG. 1 schematically shows a gas turbine engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with fuel and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

Figure 2:
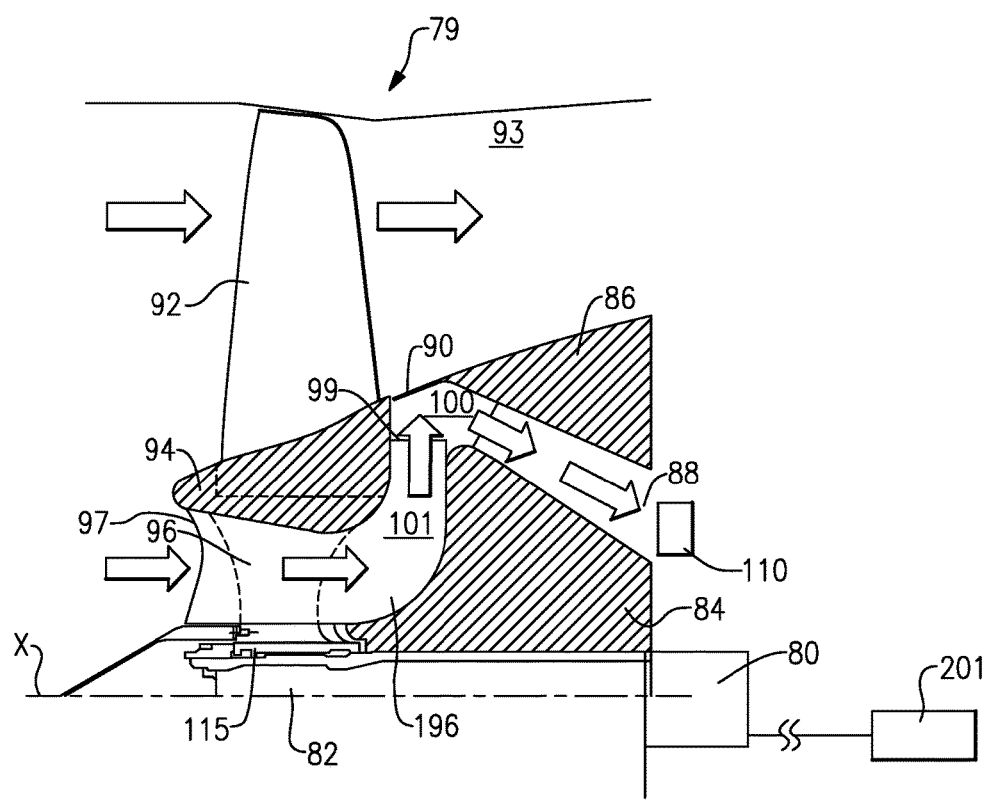
FIG. 2 shows an inventive fan arrangement.

FIG. 2 shows a fan rotor 79, which may be incorporated into an engine such as shown in FIG. 1. Rotor 79 rotates along an axis X directly driven by a turbine 201 (shown schematically). This application extends to use where a reduction gearbox 80 (shown schematically) may be positioned between the rotor 79 and turbine 201 to separate the fan and turbine rotational speeds for their respective aerodynamic efficiencies. The reduction gearbox 80 rotates a shaft 82.

Housing 84 and 86 sits axially inward of the fan rotor 79.

A fan blade 92 is generally as known, and is an axial flow fan blade positioned outwardly of a hub 94. The fan blades 92 deliver air into a bypass duct 93, as bypass or propulsion air.

Inwardly of the hub 94 is a radial compressor impeller 101 including compressor blades 196. The impeller 101 takes in air from an axial upstream inlet 97 and compresses it to a radial outlet 99 at a downstream location. Downstream of the outlet 99, the air exits into a passage 100, which is sealed by an air seal 90. From passage 100, the air reaches passage 88, and is then delivered into a compressor 110 (shown schematically).

The described arrangement thus utilizes different fan rotor sections for providing the bypass air to bypass duct 93, and for providing air that is already compressed into the outlet 88 leading to compressor 110. The use of the radial compressor impeller 101 results in a relatively axially compact arrangement. Still, the radial compressor impeller 101 provides a good deal of compression work on the air, and thus increases the efficiency of the overall engine.

A plurality of struts 96 (shown in phantom) may extend between the hub 94 and inner mount structure 115 to provide structural support for rotor 79. Struts 96 may be located between each circumferentially spaced pair of blades 196. Alternatively, a plurality of blades 196 may be formed to work as structural struts, in addition to their intended aerodynamic functions.

The fan rotor 79 includes a hub 94, a plurality of axial flow fan blades 92 extending radially outwardly of the hub, and a radial compressor impeller 101 positioned radially inwardly of the fan blades 92. Within the hub 94, the radial compressor impeller 101 has an upstream inlet 97 that extends generally in an axial direction defined by an axis of rotation X of the hub. The radial compressor impeller 101 has an outlet 99 that extends radially outwardly of the inlet 97, and into a supply passage 100/88 for supplying air to a core engine.

Packaging the radial compressor impeller 101 within the fan hub 94, will allow increased compression capability to core airflow for a given engine. As a result, an engine overall length may be reduced by eliminating one or more downstream compressor stages leading to reduced engine weight, and consequently, less fuel burn. Alternatively, retaining all compressor stages for a given engine may enable higher compressor inlet-to-outlet pressure ratio that may also lead to less fuel burn.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fan rotor comprising:
   a hub;
   a plurality of axial flow fan blades extending radially outwardly of said hub; and
   a radial compressor impeller positioned radially inwardly of said fan blades, and within said hub, said radial compressor impeller having an upstream inlet that extends generally in an axial direction defined by an axis of rotation of said hub, and said radial compressor impeller having an outlet that extends radially outwardly of said inlet, and into a supply passage for supplying air to a core engine.

2. The fan rotor as set forth in claim 1, wherein said radial compressor impeller having a plurality of circumferentially spaced blades, and there being intermediate radial vanes providing structural support between said hub and a radially inner portion of said hub.

3. The fan rotor as set forth in claim 1, wherein air delivered by said fan blades is driven into a bypass duct as propulsion air.

4. The fan rotor as set forth in claim 1, wherein said fan rotor is driven to rotate through a gear reduction.

5. A gas turbine engine comprising:
   a fan, a compressor, a combustor, and a turbine, said turbine including a fan drive turbine which drives said fan through a gear reduction; and
   the fan including a hub, and a plurality of axial flow fan blades extending radially outwardly of said hub, and a radial compressor impeller positioned radially inwardly of said fan blades, and within said hub, said radial compressor impeller having an upstream inlet that extends generally in an axial direction defined by an axis of rotation of said hub, and said radial compressor impeller having an outlet that extends radially outwardly of said inlet, and into a supply passage communicating to the compressor.

6. The engine as set forth in claim 5, wherein said radial compressor impeller having a plurality of circumferentially spaced blades, and there being intermediate radial vanes providing structural support between said hub and a radially inner portion of said rotor.

7. The engine as set forth in claim 5, wherein air delivered by said fan blades is driven into a bypass duct as propulsion air.

8. The engine as set forth in claim 5, wherein said fan is driven to rotate by said fan drive turbine through a gear reduction.

* * * * *